United States Patent
Lafond et al.

(10) Patent No.: US 11,236,831 B2
(45) Date of Patent: Feb. 1, 2022

(54) FLUID FLOW CONTROL VALVE EQUIPPED WITH A CONICAL FLAP AND SYSTEM COMPRISING SUCH VALVE

(71) Applicant: LIEBHERR-AEROSPACE TOULOUSE SAS, Toulouse (FR)

(72) Inventors: Eric Lafond, Toulouse (FR); Adrien Arnaud, Toulouse (FR); Rémi Wojcieszonak, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 24 days.

(21) Appl. No.: 16/786,161

(22) Filed: Feb. 10, 2020

(65) Prior Publication Data

US 2020/0256471 A1 Aug. 13, 2020

(30) Foreign Application Priority Data

Feb. 8, 2019 (FR) ...................... 1901253

(51) Int. Cl.
| | |
|---|---|
| *F16K 3/34* | (2006.01) |
| *F16K 3/22* | (2006.01) |
| *F16K 39/04* | (2006.01) |
| *F16K 3/18* | (2006.01) |
| *B61D 27/00* | (2006.01) |
| *B64D 13/06* | (2006.01) |

(52) U.S. Cl.
CPC ............ *F16K 3/34* (2013.01); *B61D 27/0018* (2013.01); *B64D 13/06* (2013.01); *F16K 3/22* (2013.01)

(58) Field of Classification Search
CPC ........ F16K 1/24; F16K 1/2266; F16K 5/0221; F16K 5/0257–0285; F16K 5/16; F16K 5/161; F16K 5/168; F16K 5/205; F16K 3/22; F16K 3/08; F16K 3/188; F16K 3/10; F16K 3/34; F16K 39/045; B61D 27/0018; B64D 13/06; Y10T 137/86743; F24F 13/12

See application file for complete search history.

(56) References Cited

U.S. PATENT DOCUMENTS

| | | |
|---|---|---|
| 1,956,101 A | 4/1934 | Le Noir |
| 3,421,544 A | 1/1969 | Bozoyan |
| 6,192,922 B1 * | 2/2001 | MacGibbon ............ F24F 3/167 |
| | | 137/486 |

(Continued)

FOREIGN PATENT DOCUMENTS

| | | | |
|---|---|---|---|
| DE | 102012020420 A1 * | 4/2014 | ............... F16K 3/10 |
| GB | 288403 | 4/1928 | |
| WO | WO9012258 | 10/1990 | |

*Primary Examiner* — Marina A Tietjen
(74) *Attorney, Agent, or Firm* — Steven M. Greenberg, Esq.; Shutts & Bowen LLP

(57) ABSTRACT

A valve for controlling a fluid flow includes a valve body, a shutter component configured to be able to transition from an open position allowing the circulation of fluid, to a closed position preventing the circulation of fluid. The component is characterized in that it includes a fixed conical support integral with the valve body, a conjugate conical flap rotationally movable relative to the fixed support, and fluid passage apertures respectively arranged in the conical flap and in the fixed support, and an actuator of the shutter component adapted to be able to control the position of the shutter component.

9 Claims, 5 Drawing Sheets

(56) References Cited

U.S. PATENT DOCUMENTS

| | | | |
|---|---|---|---|
| 7,470,178 B2* | 12/2008 | Tajiri | B60H 1/00685 454/155 |
| 8,678,762 B1* | 3/2014 | Baker | F04D 29/522 415/219.1 |
| 2011/0233436 A1 | 9/2011 | Perr | |
| 2015/0122340 A1 | 5/2015 | Edelmayer | |

* cited by examiner

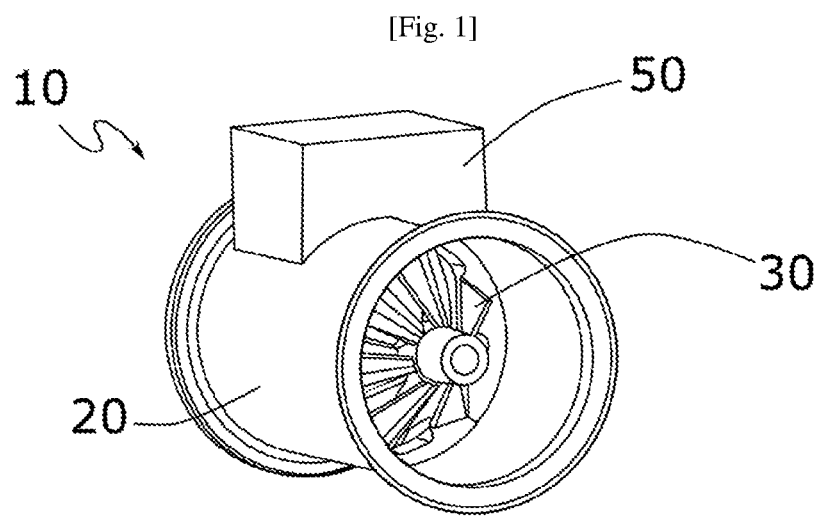
[Fig. 1]
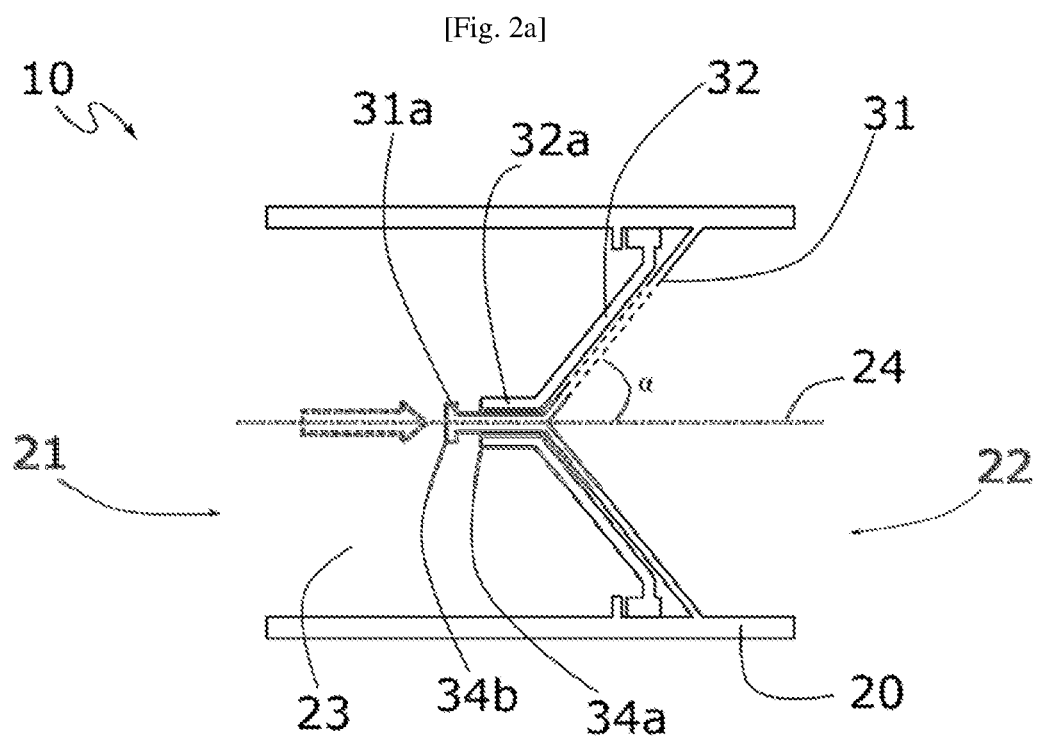
[Fig. 2a]

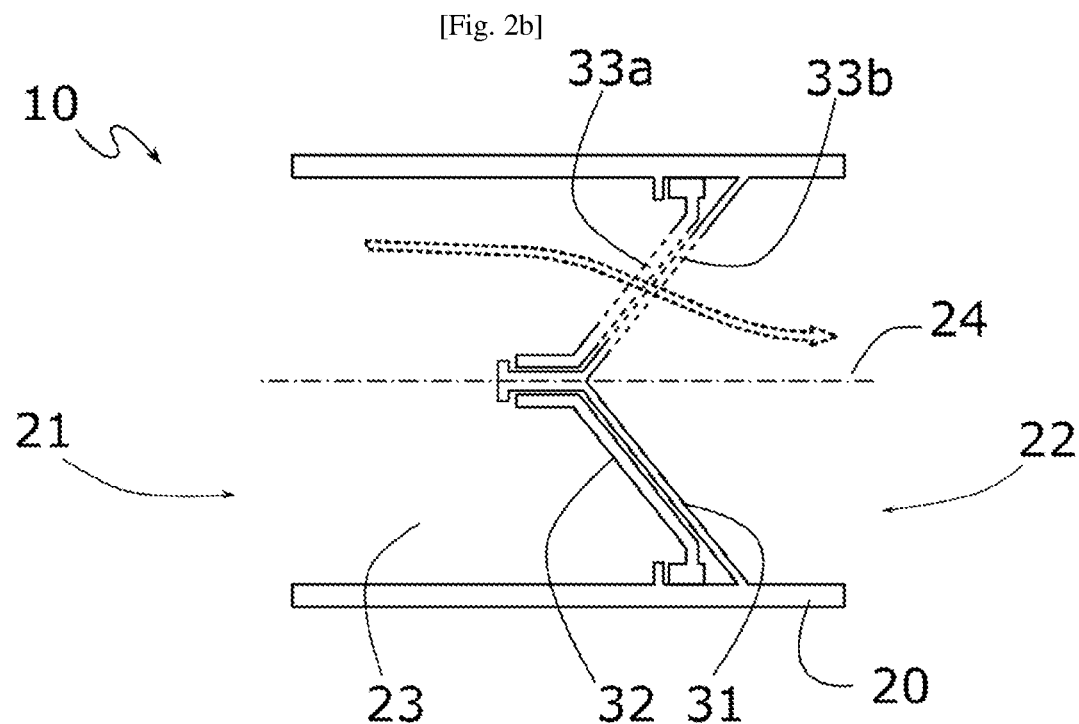
[Fig. 2b]
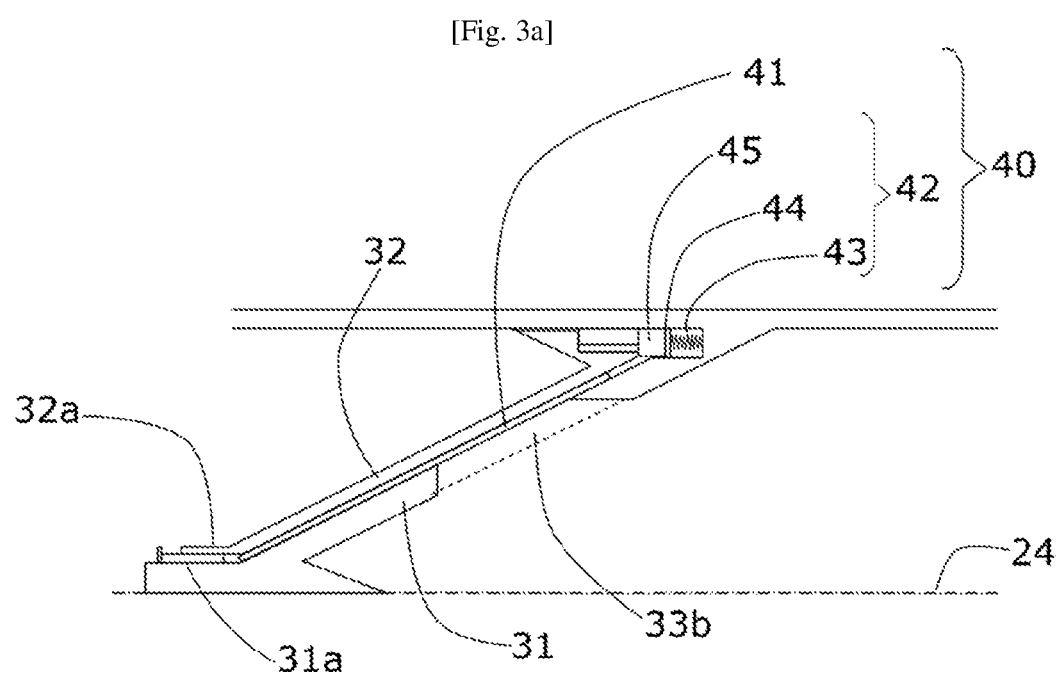
[Fig. 3a]

[Fig. 3b]
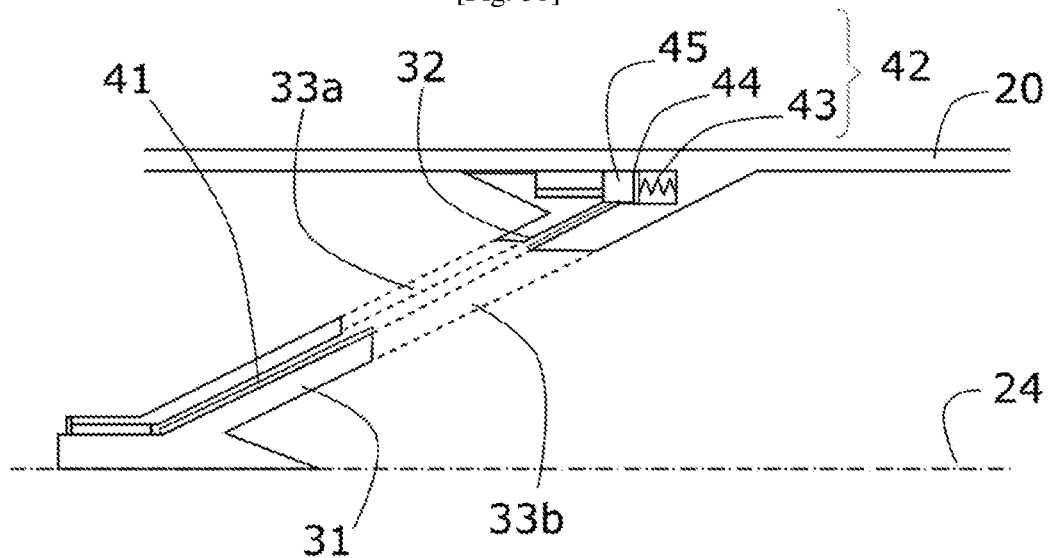
[Fig. 4a]
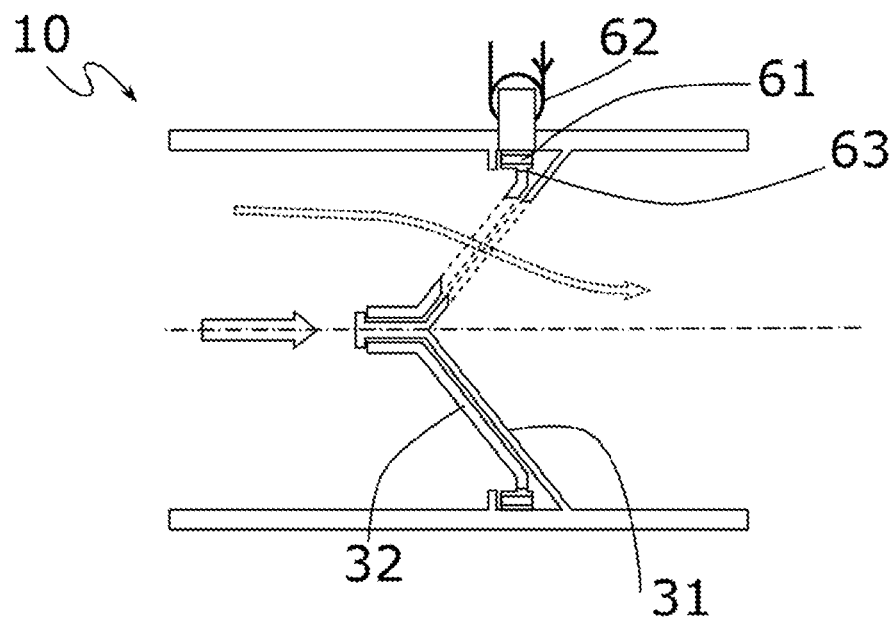

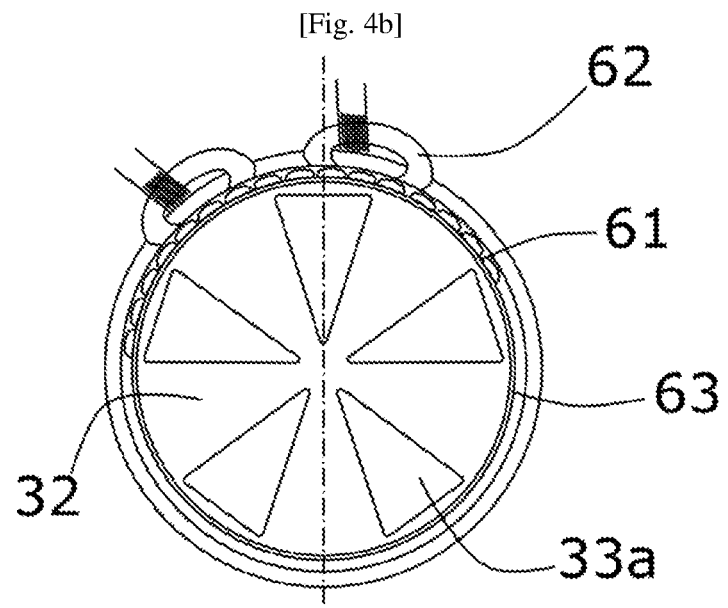
[Fig. 4b]
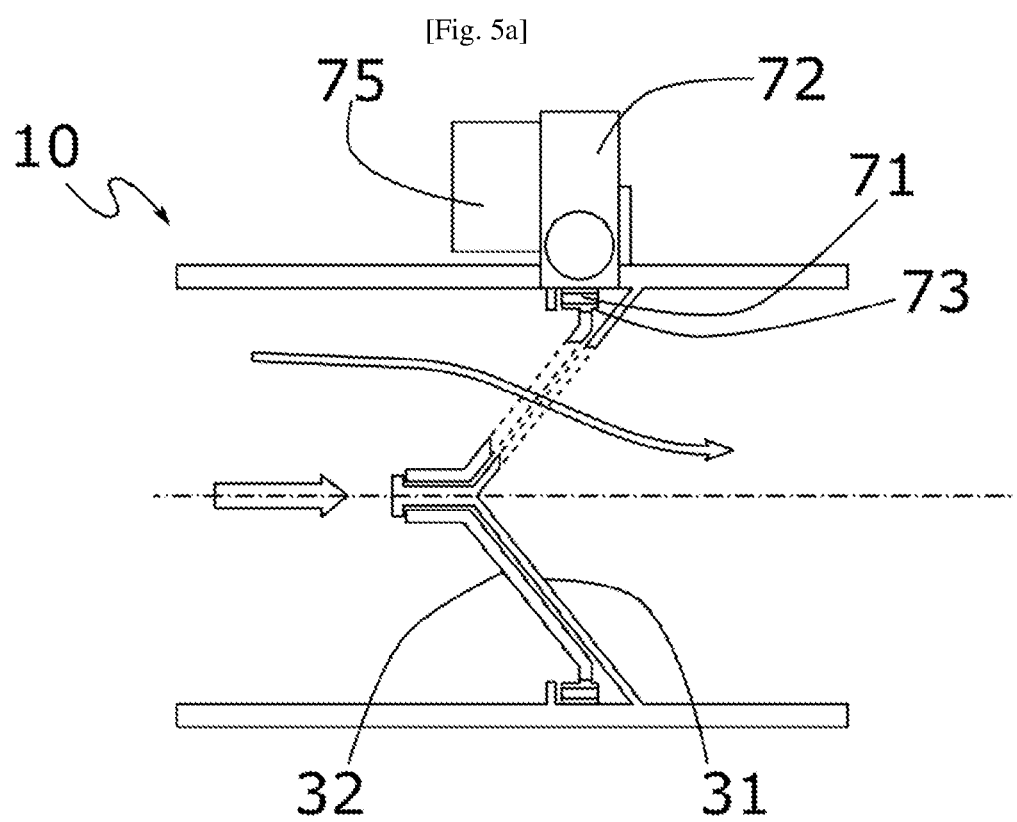
[Fig. 5a]

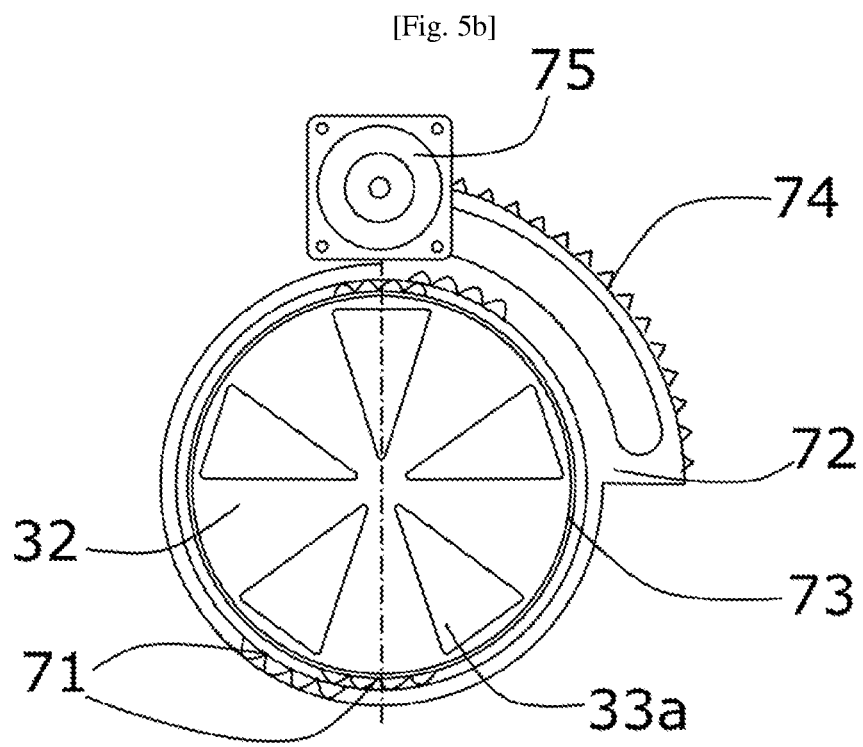
[Fig. 5b]
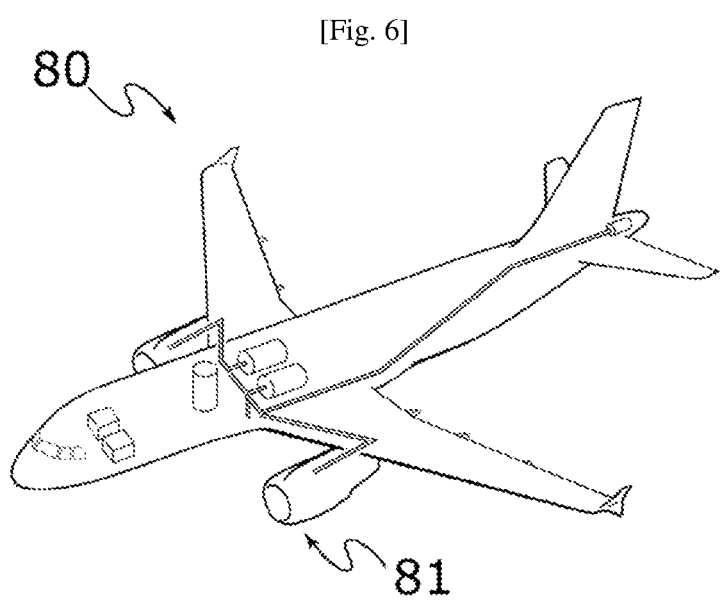
[Fig. 6]

FLUID FLOW CONTROL VALVE EQUIPPED WITH A CONICAL FLAP AND SYSTEM COMPRISING SUCH VALVE

CROSS REFERENCE TO RELATED APPLICATIONS

This application claims priority under 35 U.S.C. § 119(a) to French patent application number 1901253, filed on Feb. 8, 2019, the entire teachings of which are incorporated herein by reference.

BACKGROUND OF THE INVENTION

Technical Field of the Invention

The invention relates to a valve for controlling a fluid flow, in particular an air flow. The invention relates in particular to a conical-shaped valve for controlling a fluid flow. The invention also relates to an air conditioning system for an aircraft cabin and to a ventilation system comprising such a valve.

Description of the Related Art

An air-conditioning system for an aircraft cabin generally comprises a device for collecting compressed air on at least one compressor of an aircraft propulsion engine (or an air collection device connected to a scoop of the aircraft) and an air-cycle turbine engine comprising at least one compressor and one turbine, the compressor being supplied with air by the device for collecting compressed air, and the turbine comprising an air outlet supplying the cabin at a controlled temperature and flow rate. The air-conditioning system also includes various heat exchangers, control valves and a water extraction loop.

A fluid flow control valve is intended to control the flow rate of air circulating in the air flow duct equipped with this control valve.

Such a valve can be used, in particular, in air conditioning systems to control air flows in aircraft cabins or in air ventilation systems of aircraft engines.

Also, a valve needs to be used that has a structure making it possible to have a passage section allowing the circulation of air while ensuring an optimal seal to avoid air leaks.

To address these two constraints, one of the solutions currently implemented is to use a butterfly type valve, which has a shutter component in the form of a valve adapted to allow the shutter component to open and close. The shutter component is mounted on an axis perpendicular to the flow and passes through the valve body so as to be mechanically connected to an actuator, for example, arranged outside the valve, in order to be able to control the shutter component. Since the butterfly axis crosses the valve body, this implies deploying complex means to manage any leaks at the bearing of this axis. Most of the time, these valves are controlled by an electric, electropneumatic, pneumatic or hydraulic actuator, which allows the shutter component to move to control the air flow.

The flow rate of fluid circulating in the valve can be significant. To this end, a butterfly type valve is known to be used in order to allow fluid to pass with a high flow rate and pressure. However, this type of valve comprises, on the one hand, a butterfly making it possible to obtain a half-moon opening section, the circulation of the fluid is therefore disrupted by the presence of the butterfly. On the other hand, the movement of the butterfly cannot be achieved quickly and therefore the variation of the fluid passage section is slowed down.

Another solution could be to use an axial flap valve having an axis of rotation in the axis of the fluid flow. However, in view of the difficulty in actuating such an axial flap, this type of valve is not widespread.

As such, the invention aims to obtain a control valve having a fluid passage section equivalent to that of a butterfly valve, while allowing a variation in the fluid passage section and ensuring complete sealing of the valve.

Objectives of the Invention

The invention intends to provide a valve for controlling a fluid flow, in particular, an air flow, that overcomes at least some of the disadvantages of known solutions.

The invention relates in particular to a fluid flow control valve making it possible to obtain a passage section equivalent to a passage section obtained with a butterfly valve in the circulation channel of a valve.

The invention also intends to provide a fluid flow control valve with improved sealing.

The invention also intends to provide, in at least one embodiment, a fluid flow control valve allowing rapid variation of the passage section of the fluid circulating in the circulation channel.

The invention also intends to provide, in at least one embodiment, a fluid flow control valve, the actuation of said valve being accomplished without contact.

The invention also intends to provide an air-conditioning system equipped with a control valve according to the invention.

The invention also intends to provide a ventilation system equipped with a control valve according to the invention.

Finally, the invention intends to provide an air or rail transport vehicle equipped with an air-conditioning system or a ventilation system according to the invention.

DISCLOSURE OF THE INVENTION

To this end, the invention relates, in its broadest sense, to a fluid flow control valve comprising:

a valve body comprising a fluid inlet, a fluid outlet, and a fluid circulation channel that extends in a direction, called axial direction, between said fluid inlet and said fluid outlet, a shutter component arranged in said fluid circulation channel and configured to transition from an open position, allowing the circulation of fluid in said circulation channel between the fluid inlet and the fluid outlet or vice versa, to a closed position, preventing the circulation of fluid in the circulation channel between the fluid inlet and the fluid outlet or vice versa, an actuator of said shutter component adapted to control the position of said shutter component in said fluid circulation channel.

A valve according to the invention is characterized in that said shutter component comprises:

a conical fixed support integral with the valve body and having a tip oriented towards said fluid inlet of said valve body, a conjugate conical flap, rotationally movable relative to the fixed support and having a tip oriented towards said fluid inlet of said valve body, at least one fluid passage aperture arranged in said conical flap and at least one conjugate fluid passage aperture arranged in said fixed support so as to allow the circulation of fluid through said shutter component when said apertures are facing one another and defining said open position, a gasket seal axially arranged between said conical flap and said conical fixed support, and means for spontaneous axial movement of the conical flap against the fixed support, which means comprise at least one spring configured to allow the conical flap to be kept away from the fixed support when said shutter component is in said open position or in an intermediate position, and to be compressed when said shutter component is in said closed position, so as to allow an axial movement of said flap that compresses said gasket seal.

The valve according to the invention therefore exhibits the particularity of implementing a shutter component having a conical flap movably mounted on a conjugate conical fixed support, each comprising fluid passage apertures able to have fluid passage sections equivalent to those of a butterfly valve. In addition, these passage sections enable linearization of the circulation of a fluid in said circulation channel. To this end, the conical flap mounted to be movable in rotation on its fixed support and the fixed support are both formed by a wall of conical shape crossed by fluid passage apertures.

In other words, the conical-shaped shutter component has a tip oriented towards the fluid inlet of said valve body, so that the fluid entering through the fluid inlet first passes through the apertures of the conical flap, then through the apertures of the fixed support, before exiting by the fluid outlet of said valve body, when the shutter component is in the open position.

The invention is described throughout the text taking into consideration that the fluid passes through the valve from upstream to downstream of said fluid inlet towards said fluid outlet. This notwithstanding, nothing prevents the use of the valve according to the invention, providing that it is supplied with fluid through said fluid outlet in such a manner that the fluid exits the valve, after having passed through the shutter component, via said fluid inlet. In other words, the valve according to the invention can be bidirectional and said fluid inlet and said fluid outlet can, depending on the applications, form an effective fluid inlet or outlet.

Preferably, when the fluid exits the valve, after passing through the shutter component, via said fluid inlet, the flap is mounted on the support so that the fluid entering via the fluid outlet first passes through the apertures of the conical flap, then through the apertures of the fixed support, before exiting through the fluid inlet of said valve body, when the shutter component is in the open position.

The control of the fluid by the valve according to the invention is enabled by the presence of a shutter component, which exhibits at least one first position, called open position, allowing the circulation of the fluid from the fluid inlet to the fluid outlet of the valve body (or vice versa), and at least one second position, called closed position, in which the shutter component prevents the circulation of the fluid in the circulation channel between the fluid inlet and the fluid outlet (or vice versa).

In the position, called open position, the circulation of the fluid through the fluid passage apertures can be at its maximum. In the position, called closed position, the fluid is blocked by the respective walls of the conical flap and of the fixed support, which prevents any circulation of fluid through the shutter component.

Said conical flap and said fixed support are respectively formed of a wall, in which passage apertures are provided. Thus, the apertures define the passage section through which the fluid can circulate and the walls define a means of impeding the free circulation of the fluid. When the walls of the conical flap obstruct the fluid passage apertures of the fixed support, the passage of the fluid is blocked in the fluid circulation channel.

All the intermediate positions allow the flow rate of fluid within the fluid circulation channel to be controlled.

When the passage apertures are partially arranged opposite each other, partial passage sections are formed, thereby enabling control of the fluid flow rate between the fluid inlet and the fluid outlet (or vice versa). These positions correspond to the intermediate positions of the shutter component.

The passage apertures respectively arranged on said conical flap and on said fixed support have a particular structure adapted to the conical shape. Placing the respective apertures of the conical flap and of the fixed support in front of one another makes it possible to free up an axial-radial passage section, through which the fluid can circulate freely when the shutter component is in the open or an intermediate position.

In other words, the conical configuration of the shutter component makes it possible to define sections of fluid passages equivalent to those of a butterfly valve and therefore makes it possible to generate a more linear circulation of fluid (relative to the butterfly), especially when the flow rate is high. The fluid thus circulates in a generally linear manner without being diverted towards the axis of the valve.

In addition, the fluid passage sections formed by the apertures of the shutter component can have different geometric shapes. Preferably, the passage sections have a triangular shape, more precisely an isosceles triangle with the tip oriented towards the fluid inlet of the valve body.

The control of the opening/closing of the shutter component, and as a consequence of the alignment of the passage apertures of said conjugate flap and support with one another, makes it possible to control the flow rate of the flow passing through the valve.

The valve according to the invention also advantageously makes it possible to define a safety position of the valve. To this end, the geometry of the conical flap can be defined so as to create an aerodynamic rotation torque, which causes the spontaneous tilting of said flap in a preferred position, called safety position, in the absence of a command from the actuator. This safety position can correspond, depending on the applications, to the open position, the closed position or any intermediate position. This advantageous variant makes it possible to guarantee, simply by the geometry of the conical flap, that the flap spontaneously moves towards the safety position, when a problem such as a failure of the actuator of said conical flap occurs.

According to the invention, the actuator is configured to allow the shutter component to be moved and thus the fluid flow rate to be controlled. This actuator itself can be controlled by a control unit configured to set the position of the shutter component in the fluid circulation channel.

According to the invention, the sealing of said control valve is ensured by a gasket seal and the means for spontaneous axial movement of the conical flap against the conical fixed support. The gasket seal is arranged between the conical flap and the fixed support and extends from the tip of the fixed support to its distal end integral to the valve body.

Consequently, when the shutter component is in the closed position, the fluid exerts a force against said conical flap, which causes it to be pressed against said fixed support, on which it is mounted, and thus forces the flap to be fixedly held against said support, thereby improving the sealing of the shutter component.

According to a variant of the invention, the seal can be directly fastened to the walls of the fixed support. According to another variant of the invention, it can be fastened to the walls of the conical flap. Preferably, the seal is fastened to the walls of the support to remain set during the rotation of the flap and to avoid being set in motion. The means for axial movement of the flap comprise at least one spring integral with the flap that exhibits a certain determined stiffness in order to guarantee the axial movement necessary to allow the conical flap to be kept away from the fixed support when the shutter component is in said open position or in an intermediate position, and to ensure compression of said seal between the flap and the support when said shutter component is in said closed position. During the rotation of the flap, the presence of the spring makes it possible to create a spacing between the flap and the support to avoid friction of the gasket seal when the flap rotates. This spacing also makes it possible to avoid friction of the flap against the seal and consequently to protect the seal from accelerated wear.

During the rotation of the conical flap from the open position to the closed position, while passing through an intermediate position, the flap is gradually subjected to the aerodynamic pressure of the fluid passing through the apertures of the flap and pressing on the walls of the conical flap.

In the closed position, the fluid flow exerts a force against the flap that causes the axial movement of the flap against its support and ensures the compression of the gasket seal.

The actuator of the shutter component therefore forces the flap to overcome the friction caused by the seal that transforms into a resistive torque.

To limit the torque resistance, means for spontaneous axial movement of the conical flap against the fixed support make it possible to ensure complete and axial sealing when the flap is in the closed position. These means are integral to the flap at the distal end of the flap.

In addition, the spacing provided between the flap and the support makes it easier to rotate the flap relative to the support. The seal housed in this spacing undergoes attenuated compression during rotation, which causes a reduction in friction. Therefore, the gasket seal is not compressed or is only slightly compressed and improves the rotation of the flap when moving from the closed position to the open position and vice versa.

A valve according to the invention can be implemented to control any type of fluid, in particular air, oil, fuel, and in general any type of fluid the flow rate of which must be controlled, for example, within an aeronautical, railway or automobile application.

Advantageously and according to the invention, said conical flap and said fixed support each respectively comprise an odd number of regularly distributed fluid passage apertures.

An odd number of fluid passage apertures allows the distribution of forces to be improved and the antagonistic forces exerted by the fluid flow on the flap and the support to be limited.

The passage apertures are preferably evenly distributed on said flap and said support in order to allow a homogeneous passage of fluid in the circulation channel.

According to this variant, the passage apertures of said flap and of said support are arranged in a uniform and identical manner on the conjugate flap and support.

There can be any number of air passage apertures. For example, there is nothing to prevent the provision of a shutter component equipped with a single aperture or with N apertures, where N is any predetermined integer, preferably greater than or equal to 3, for example, 5. The interval in which a fluid can circulate defines the angular range of the apertures.

According to this variant, there are 5 of said apertures, so that the angular range of the apertures forms an angle of 36°.

Advantageously and according to the invention, said valve also has at least one axis of symmetry that extends along the axial direction from said tip of the fixed support and an angle α defining an inclination of said apertures of the conical flap and of the fixed support with respect to said axis of symmetry of the valve, said angle α being less than or equal to 30°.

According to this variant, the inclination of said axial-radial apertures allows the fluid to pass through the shutter component in a generally linear manner. In other words, the fluid circulating in the circulation channel is hardly disrupted by the presence of the conical shutter component and therefore the direction of the fluid is virtually unchanged and remains linear.

This configuration thus makes it possible to maintain a linearity in the movement of the fluid and therefore to ensure fluid circulation that is not disrupted by the presence of the shutter component.

When considering a flat flap perpendicular to the axis of the valve comprising 5 apertures each having an angular range of 36°, the maximum opening section of the valve is equivalent to 180°, which corresponds to half of the circulation channel of the valve.

The surface of an aperture in a flat flap is defined by the surface S1 and the surface of an aperture in a conical flap, as described by the invention, is defined by the surface S2. It is thus possible to determine that the surface S2 is equal to the ratio of the surface S1 by the sine of the angle α ($S2=S1/\sin(\alpha)$). Considering an angle α of 30°, the sine of the angle α is equal to 0.5. It is therefore possible to determine the relationship $S2=S1/\sin(30)$ and therefore $S2=S1*2$. The surface S2 of an aperture in a conical flap (with an angle of 30°) is therefore equal to twice the surface S1 of an aperture in a flat flap perpendicular to the axis of symmetry.

Since the opening of the 5 apertures in a flat flap corresponds to half of the circulation channel and since the area S2 of a conical aperture is equal to twice the area S1 of an aperture in a flat flap, the opening of 5 conical apertures allows provision of the section of the whole of the valve circulation channel.

Preferably, said shutter component comprises 5 fluid passage apertures having an angular range of 36° and an angle α of 30°.

Advantageously and according to the invention, said actuator comprises contactless actuation means of said shutter component.

Advantageously and according to the invention, said contactless actuation means of said shutter component are electromagnetic means or magnetic means housed outside the fluid circulation channel.

According to this variant, said contactless actuation means allow the shutter component to move and therefore the fluid to be controlled while being housed outside the valve body. The actuation of the shutter component is therefore simplified by means of a magnetic or electromagnetic drive.

The use of contactless magnetic or electromagnetic means thus makes it possible to dispense with the management of fluid losses by allowing contactless control between said actuator and said shutter component.

According to this variant, positioning the actuator outside the body also makes it possible to avoid leaks of fluid circulating in the circulation channel and therefore to improve the sealing of said flow control valve.

Advantageously and according to the invention, said electromagnetic means comprise at least one stator winding and said conical flap comprises permanent magnets.

According to this variant, said electromagnetic means make it possible, by means of a stator winding arranged on said valve body, to control the rotation of the conical flap fitted with permanent magnets by controlling the current supplying this stator winding.

Thus, the use of such electromagnetic means eliminates the need of a pass through of the valve body to connect the actuator to the shutter component.

The electromagnetic means thus make it possible to avoid being in direct contact with the conical flap and consequently to improve the sealing of the valve.

Advantageously and according to the invention, said magnetic means comprise a magnetic ring provided with permanent magnets extending around the valve body, said magnetic ring being adapted to be driven in rotation by an electric motor, and said conical flap includes permanent magnets adapted to interact with said permanent magnets of said magnetic ring, allowing its rotation.

According to this variant, said magnetic means make it possible, via an electric motor and a magnetic ring, to control the rotation of the flap without contact between said flap and said magnetic means.

In addition, said electric motor drives the rotation of a shaft that supports a gear wheel. The periphery of the magnetic ring is provided with gear teeth, on which the toothed wheel meshes.

The magnetic ring and the conical flap each comprise permanent magnets on their circumference, which are arranged symmetrically, so that when the magnetic ring is rotated by the electric motor, this causes the rotation of the flap by the attraction of the magnetic magnets mounted on the ring and on the flap.

The movement of the magnetic ring by the electric motor allows the rotation of the flap by means of the magnetic attraction of the magnets arranged respectively on the ring and the flap. The movement of the flap causes the shutter component to close or open.

According to this variant, the sealing is improved by virtue of the lack of contact between said magnetic means and the shutter component. In addition, this configuration allows easy access to the magnetic means, which facilitates their possible maintenance.

According to this variant, said flap and said ring exhibit a plurality of permanent magnets. The number of permanent magnets can vary depending on the type of valve. Preferably, an even number of magnets is preferred, for example, 2, 4 or 6 magnets.

According to this variant, the symmetrical configuration of the magnetic drive also makes it possible to act on the flap as a magnetic bearing, thus making it possible to attenuate the vibrations of said flap when the valve is subjected to vibrational excitation, which is the case, for example, for aeronautical applications.

Advantageously and according to the invention, said valve further comprises at least one contactless Hall effect sensor making it possible to measure a variation in magnetic field in order to obtain a change in state of the limit switch signal.

Such a Hall effect sensor arranged in the valve body advantageously makes it possible to provide the valve with a limit switch detection functionality.

The invention also relates to an air-conditioning system for an air or rail transport vehicle comprising at least one air control valve according to the invention.

The advantages of such a control valve according to the invention apply mutatis mutandis to an air-conditioning system according to the invention.

The invention also relates to an air or rail transport vehicle comprising at least one propulsion engine, a cabin and at least one air-conditioning system for said cabin, characterized in that the air conditioning system of the cabin is the air conditioning system according to the invention.

The advantages of an air-conditioning system according to the invention apply mutatis mutandis to an air or rail transport vehicle according to the invention.

The invention also relates to a valve, an air conditioning system, a ventilation system and an air or rail transport vehicle, characterized in combination by all or some of the features mentioned above or below.

LIST OF FIGURES

Further aims, features and advantages of the invention will become apparent upon reading the following description, which is provided solely by way of non-limiting example, and which refers to the accompanying figures, in which:

FIG. 1 is a schematic cross-sectional view of a valve according to one embodiment of the invention.

FIG. 2a is a schematic cross-sectional view of a valve according to one embodiment of the invention, illustrating the shutter component in the closed position.

FIG. 2b is a schematic cross-sectional view of a valve according to one embodiment of the invention, illustrating the shutter component in the open position.

FIG. 3a is a schematic cross-sectional view of the shutter component according to one embodiment of the invention, illustrating the sealing means in the closed position.

FIG. 3b is a schematic cross-sectional view of the shutter component according to one embodiment of the invention, illustrating the sealing means in the open position.

FIG. 4a is a schematic cross-sectional view of a valve according to one embodiment of the invention, illustrating the shutter component in the open position, controlled by an electromagnetic actuator.

FIG. 4b is a schematic cross-sectional view of a valve according to FIG. 4a, illustrating the device for controlling a valve by the electromagnetic actuator.

FIG. 5a is a schematic cross-sectional view of a valve according to one embodiment of the invention, illustrating the shutter component in the open position, controlled by a magnetic actuator.

FIG. 5b is a schematic cross-sectional view of a valve according to FIG. 5a, illustrating the device for controlling a valve by the magnetic actuator.

FIG. 6 is a schematic view of an aircraft according to one embodiment.

DETAILED DESCRIPTION OF AN EMBODIMENT OF THE INVENTION

For the sake of illustration and clarity, the scales and proportions are not strictly adhered to in the figures. Throughout the following detailed description, with reference to the figures, unless otherwise indicated, each element of the valve is described as it is arranged when said conical flap is rotationally movable on a fixed support in the valve body and is controlled by an actuator arranged outside the valve body.

The terms "axial" and "radial" are used with reference to the axial direction, which is defined by the direction of the fluid circulation channel extending between the fluid inlet and the fluid outlet of the valve body.

In addition, identical, similar or analogous elements are denoted using the same reference signs throughout the figures.

Throughout the following description, the control valve described is a valve of an air-conditioning system of an aircraft. However, in other embodiments, the valve can be a control valve for a fluid other than air and can be provided in systems other than air-conditioning systems.

In addition, the valve is described taking into consideration that the air passes through the valve from upstream to downstream from the air inlet towards the air outlet. That being said, nothing prevents the valve from being used in anticipation of providing it with air through said air outlet, so that the air exits the valve, after having passed through the shutter component, through said air inlet. In other words, the valve according to the invention can be used bidirectionally.

As shown in FIG. 1, a valve 10 according to the invention comprises a valve body comprising a casing 20, a shutter component 30 and an electric actuator 50 of the shutter component that is arranged outside said valve body.

As illustrated in FIGS. 2a and 2b, said valve 10 comprises an air inlet 21, an air outlet 22, an air circulation channel 23, which extends between the air inlet and outlet in an axial direction 24. Said shutter component 30 extends in the axial direction 24 and is arranged in said air circulation channel 23.

As illustrated in FIGS. 2a to 5b, the shutter component 30 comprises a conical flap 32 mounted movably in rotation on a fixed conjugate conical support 31. The conical flap 32 comprises a tip 32a arranged towards the air inlet in the circulation channel. The tip 32a is borne by a bearing 31a of the fixed support 32 that also forms an axial stop. The rotation of the tip 32a of the movable flap 32 on the bearing 31a of the support 31 is obtained, for example, by means of a ball bearing or a needle roller and cage assembly, not shown in the figures for the sake of clarity.

The air circulation is ensured by the presence of the air passage apertures 33a, 33b, respectively arranged on said flap 32 and said support 31. Given the conical shape of the shutter component, the apertures 33a, 33b form axial-radial air passage cross-sections, which allow fluid communication to be established between the air inlet 21 and the air outlet 22 of the valve when they are placed opposite one another by rotation of the movable flap 32 on the fixed support 31.

In FIG. 2a, the shutter component is in the closed position and the air is blocked by the shutter component by the overlap of the walls of the flap 32 on the apertures 33b of the support 31. According to this embodiment, the walls of the flap 32 can be bigger than the apertures 31b of the support.

In FIG. 2b, the shutter component is in the open position and the air passes through the apertures 33a, 33b of the air passage. This air circulation through the air passages is schematically represented by the dashed arrows.

According to one embodiment and as illustrated by FIGS. 3a and 3b, the valve 10 comprises sealing means 40 arranged between the flap 32 and the support 31. For the sake of clarity, the sealing means 40 are not shown in FIGS. 2a, 2b, 4a to 5b.

As shown in FIGS. 3a and 3b, a gasket seal 41 is arranged between said flap 32 and the support 31 for sealing over the entire length of the shutter component when said component is in the closed position. The seal 41 extends from the tip of the shutter component to its distal end.

According to this embodiment, the seal 41 is fastened to the walls of the support 31 so as to remain set during the rotation of the flap. For example, the seal can be a bonded silicone seal, but other materials allowing sealing can be contemplated, depending on the type of application and the type of fluid passing through the shutter component.

When the shutter component 30 is in the open position, a spacing is maintained between the flap 32 and the support 31 through the presence of a spring 43. This spacing corresponds to a gap for promoting the rotation of the flap 32 on the support 31, while preventing the seal 41 fastened on the conical flap 32 from rubbing against the fixed support 31.

In addition to the gasket seal 41, means 42 for spontaneous axial movement of the conical flap 32 contribute to improve the sealing of the shutter component.

These means 42 comprise a spring 43 bearing on a support washer 44, which rests on a graphite segment 45. These means 42 are integral to the flap 32 at the distal end. The support washer 44 makes it possible to limit the friction of the spring 43 on the graphite segment 45. The spring 43 can be compressed when the shutter component is in the closed position, as shown in FIG. 3a. It can also be uncompressed and thus keep the flap 32 away from its support 31 when the shutter component is in the open position, as shown in FIG. 3b.

As illustrated in FIG. 3a, the shutter component is in the closed position and said walls of said flap 32 overlap the apertures 33b of the support 31 so as to prevent the passage of air. Furthermore, the air circulating in the circulation channel exerts a force against the flap 32, which causes the axial movement of the flap 32 towards the fixed support, compressing the spring 43, and ensures the compression of the gasket seal 41 against the fixed support. The stiffness of the spring 43 is selected to allow axial movement of the conical flap 32 when the valve is in the closed position.

As illustrated in FIG. 3b, the shutter component 30 is in the open position and the passage of air through the passage apertures 33a, 33b is authorized. In this position, the spring 43 is not compressed and it forms a gap between the flap and the support. The gasket seal 41 is housed in this gap and is not compressed.

When the shutter component 30 passes from the open position to the closed position, the rotation of the flap 32 is controlled by an actuator 50.

Furthermore, according to one embodiment, the actuation of the conical flap is ensured by means of permanent magnets. These permanent magnets 51 are arranged at the distal end of the flap 32. They are preferably integral with the graphite segment 45.

FIGS. 4a to 5b schematically illustrate the operating principle of an actuator 50 for controlling a shutter component 30 of a valve according to one embodiment of the invention. For the sake of clarity, the sealing means 40 are not shown in these Figs.

According to the embodiment shown in FIGS. 4a and 4b, the shutter component is controlled by contactless electromagnetic means 60 to move the flap 32 and thus ensure the movement of the shutter component 30 from the open position to the closed position and vice versa.

FIG. 4a illustrates a valve controlled by contactless electromagnetic means 60, the shutter component 30 being in the open position allowing the circulation of air.

As shown in FIG. 4b, the electromagnetic actuator is formed of two coils 62 mounted on the valve body outside the valve. The flap 32 comprises, on its distal part, a magnetic yoke 63, on which permanent magnets 61 are mounted. Thus, the yoke optimizes the induced torque. The magnets 61 can assume the form of tiles and exhibit an alternating polarity on an angular arc that is sufficient to achieve full opening of the valve. The two coils 62 perform the phase A and phase B functions of a bipolar stepper type motor and the flap 32 is used as a flap of the stepper type motor. When the coils 62 are crossed by a current, the magnets 61 orient themselves according to the magnetic field generated by the coils 62 and drive the movement of the flap 32 to allow the opening or closing of the shutter component 30.

According to this embodiment, the magnetic tiles can also form means for axial movement of the conical flap through a magnetic twist of the tiles.

According to another embodiment shown in FIGS. 5a and 5b, the actuator is a magnetic type actuator 70 arranged outside the valve body 20.

FIG. 5a illustrates a valve controlled by a magnetic actuator 70 and the shutter component 30 of which is in the open position allowing the circulation of air.

As illustrated in FIG. 5a, the magnetic actuator 70 is formed by an electric motor 75 comprising a pinion meshed on a toothed wheel 74 in order to move the magnetic ring 72 on which permanent magnets 71 are arranged. The flap 32 comprises, on its distal part, a magnetic yoke 73, on which permanent magnets 71 are arranged. The magnetic ring 72 and the flap 32 respectively comprise four permanent magnets distributed symmetrically so as to carry out the drive by magnetic attraction between opposite poles of the magnets. The starting of the electric motor 75 drives the movement of the magnetic ring 72 and, consequently, the movement of the permanent magnets 71 borne by this magnetic ring. This movement of the magnets causes the flap 32 to rotate, which therefore determines the opening and closing of the shutter component.

According to another embodiment not shown in the figures, the magnetic actuator arranged outside the valve body can be an electric motor that rotates a magnetic endless screw using a toothed wheel. The magnets of the endless screw are arranged along a helix that runs around the entire circumference of the endless screw. The flap 32 comprises, at its distal end, a magnetic yoke 53, on which permanent magnets 61 are mounted.

The magnets used in this type of application can be samarium-cobalt magnets, making it possible to withstand high temperatures of the order of 260° C.

The various embodiments presented above make it possible to obtain contactless drive by an electromagnetic or magnetic actuator and thus ensure optimum sealing of the valve.

The invention is not limited solely to the embodiments described. In particular, according to another embodiment, the conical flap can be controlled with contact between the flap and the actuator. According to this embodiment, the flap is devoid of permanent magnets and only comprises a toothed wheel, driven directly by the pinion of the motor arranged outside the valve body. Other solutions can be contemplated to ensure the drive of a conical flap on a fixed support and thus form a valve according to the invention.

The invention claimed is:

1. A valve for controlling a fluid flow comprising:
    a valve body comprising a fluid inlet, a fluid outlet, a fluid circulation channel, which extends in a direction, called axial direction, between said fluid inlet and said fluid outlet,
    a shutter component arranged in said fluid circulation channel and configured to be able to transition from an open position allowing fluid to circulate in said circulation channel between the fluid inlet and the fluid outlet or vice versa, to a closed position preventing fluid from circulating in the circulation channel between the fluid inlet and the fluid outlet or vice versa,
    an actuator of said shutter component adapted to be able to control the position of said shutter component in said fluid circulation channel characterized in that said shutter component comprises:
    a fixed conical support integral with the valve body and having a tip oriented towards said fluid inlet of said valve body,
    a conjugate conical flap rotationally movable relative to the fixed support and having a tip oriented towards said fluid inlet of said valve body,
    at least one fluid passage aperture arranged in said conical flap and at least one conjugate fluid passage aperture arranged in said fixed support so as to allow fluid to circulate through said shutter component when said apertures are opposite one another and defining said open position,
    a gasket seal axially arranged between said conical flap and said fixed conical support, and
    means for spontaneous axial movement of the conical flap against the fixed support, which means comprise at least one spring configured to allow the conical flap to be kept away from the fixed support when said shutter component is in said open position or in an intermediate position and to be compressed when said shutter component is in said closed position, so as to allow axial movement of said flap that compresses said gasket seal.

2. The fluid flow control valve according to claim 1, characterized in that said conical flap and said fixed support each respectively comprise an odd number of evenly distributed fluid passage apertures.

3. The fluid flow control valve according to claim 1, characterized in that it further has at least one axis of symmetry that extends along the axial direction from said tip of the fixed support and an angle α defining an incline of said apertures of the conical flap and of the support fastened relative to said axis of symmetry of the valve, said angle α being less than or equal to 30°.

4. The fluid flow control valve according to claim 1, characterized in that said actuator comprises contactless actuation means of said shutter component.

5. The fluid flow control valve according to claim 4, characterized in that said contactless actuation means of said shutter component comprise electromagnetic means or magnetic means housed outside the fluid circulation channel.

6. The fluid flow control valve according to claim 5, characterized in that said electromagnetic means comprise at least one stator winding and said conical flap comprises permanent magnets.

7. The fluid flow control valve according to claim 5, characterized in that said magnetic means comprise an electric motor mounted on a magnetic ring provided with magnets and said conical flap comprises magnets.

8. An air-conditioning system for an air or rail transport vehicle, the system comprising:
an air-conditioner; and,
an air control valve controlling passage of air in the air-conditioner, the valve comprising:
a valve body comprising a fluid inlet, a fluid outlet, a fluid circulation channel, which extends in a direction, called axial direction, between said fluid inlet and said fluid outlet,
a shutter component arranged in said fluid circulation channel and configured to be able to transition from an open position allowing fluid to circulate in said circulation channel between the fluid inlet and the fluid outlet or vice versa, to a closed position preventing fluid from circulating in the circulation channel between the fluid inlet and the fluid outlet or vice versa,
an actuator of said shutter component adapted to be able to control the position of said shutter component in said fluid circulation channel characterized in that said shutter component comprises:
a fixed conical support integral with the valve body and having a tip oriented towards said fluid inlet of said valve body,
a conjugate conical flap rotationally movable relative to the fixed support and having a tip oriented towards said fluid inlet of said valve body,
at least one fluid passage aperture arranged in said conical flap and at least one conjugate fluid passage aperture arranged in said fixed support so as to allow fluid to circulate through said shutter component when said apertures are opposite one another and defining said open position,
a gasket seal axially arranged between said conical flap and said fixed conical support, and
means for spontaneous axial movement of the conical flap against the fixed support, which means comprise at least one spring configured to allow the conical flap to be kept away from the fixed support when said shutter component is in said open position or in an intermediate position and to be compressed when said shutter component is in said closed position, so as to allow axial movement of said flap that compresses said gasket seal.

9. An air or rail transport vehicle comprising
at least one propulsion engine, a cabin and at least one air-conditioning system for said cabin, characterized in that the air-conditioning system for the cabin comprises an air control valve comprising:
a valve body comprising a fluid inlet, a fluid outlet, a fluid circulation channel, which extends in a direction, called axial direction, between said fluid inlet and said fluid outlet,
a shutter component arranged in said fluid circulation channel and configured to be able to transition from an open position allowing fluid to circulate in said circulation channel between the fluid inlet and the fluid outlet or vice versa, to a closed position preventing fluid from circulating in the circulation channel between the fluid inlet and the fluid outlet or vice versa,
an actuator of said shutter component adapted to be able to control the position of said shutter component in said fluid circulation channel characterized in that said shutter component comprises:
a fixed conical support integral with the valve body and having a tip oriented towards said fluid inlet of said valve body,
a conjugate conical flap rotationally movable relative to the fixed support and having a tip oriented towards said fluid inlet of said valve body,
at least one fluid passage aperture arranged in said conical flap and at least one conjugate fluid passage aperture arranged in said fixed support so as to allow fluid to circulate through said shutter component when said apertures are opposite one another and defining said open position,
a gasket seal axially arranged between said conical flap and said fixed conical support, and
means for spontaneous axial movement of the conical flap against the fixed support, which means comprise at least one spring configured to allow the conical flap to be kept away from the fixed support when said shutter component is in said open position or in an intermediate position and to be compressed when said shutter component is in said closed position, so as to allow axial movement of said flap that compresses said gasket seal.

* * * * *